United States Patent
Sasaki

(10) Patent No.: US 9,966,635 B2
(45) Date of Patent: May 8, 2018

(54) ELECTRIC STORAGE DEVICE

(75) Inventor: Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 1409 days.

(21) Appl. No.: 13/419,319

(22) Filed: Mar. 13, 2012

(65) Prior Publication Data

US 2012/0237810 A1   Sep. 20, 2012

(30) Foreign Application Priority Data

Mar. 16, 2011   (JP) .................................. 2011-058174

(51) Int. Cl.
| | |
|---|---|
| H01M 10/04 | (2006.01) |
| H01M 2/02 | (2006.01) |
| H01M 10/0587 | (2010.01) |
| H01M 4/64 | (2006.01) |
| H01M 2/26 | (2006.01) |

(52) U.S. Cl.
CPC ......... *H01M 10/0587* (2013.01); *H01M 2/02* (2013.01); *H01M 2/263* (2013.01); *H01M 4/64* (2013.01); *H01M 10/0431* (2013.01); *Y10T 29/49117* (2015.01)

(58) Field of Classification Search
CPC .......... H01M 2/02; H01M 2/263; H01M 4/64; H01M 10/0587; H01M 10/0431
See application file for complete search history.

(56) References Cited

U.S. PATENT DOCUMENTS

| | | | |
|---|---|---|---|
| 4,401,730 A | 8/1983 | Szymborski et al. | |
| 4,892,794 A | 1/1990 | Scholz | |
| 6,335,114 B1 | 1/2002 | Ueshima et al. | |
| 2004/0115530 A1 | 6/2004 | Maeda et al. | |
| 2007/0122715 A1 | 5/2007 | Fujino et al. | |
| 2008/0268340 A1 | 10/2008 | Kuwahara et al. | |

(Continued)

FOREIGN PATENT DOCUMENTS

| | | |
|---|---|---|
| CN | 1864288 A | 11/2006 |
| EP | 1 947 710 A1 | 7/2008 |

(Continued)

OTHER PUBLICATIONS

Extended European Search Report dated Sep. 16, 2016.

*Primary Examiner* — Ula C Ruddock
*Assistant Examiner* — Frank A Chernow
(74) *Attorney, Agent, or Firm* — McGinn IP Law Group, PLLC.

(57) ABSTRACT

An electric storage device, includes an electrode assembly that includes a positive electrode and a negative electrode each including a current collector provided with an active material layer on a surface thereof except one end, the positive electrode and the negative electrode being wound or stacked with a separator interposed therebetween, wherein one end of one of the positive electrode and the negative electrode on at least one side of the electrode assembly protrudes, as active material layer-unformed parts, from a side end of the remaining electrode different in polarity; a case for housing the electrode assembly with the protruding direction of the one end oriented sideways; and an electrolytic solution being reserved in the case, wherein the active material layer-unformed parts include electrolytic solution-sucking-up layers that are porous and are formed along a direction orthogonal to the protruding direction of the one end.

12 Claims, 6 Drawing Sheets

(56) References Cited

U.S. PATENT DOCUMENTS

2009/0291355 A1    11/2009   Baba et al.
2012/0021264 A1     1/2012   Morishima

FOREIGN PATENT DOCUMENTS

| | | |
|---|---|---|
| JP | H 02-78161 A | 3/1990 |
| JP | 6-333568 A | 12/1994 |
| JP | H 11-73985 A | 3/1999 |
| JP | H 11-111302 A | 4/1999 |
| JP | 2001-093499 A | 4/2001 |
| JP | 2001-229973 A | 8/2001 |
| JP | 2001-319693 A | 11/2001 |
| JP | 2001-332307 A | 11/2001 |
| JP | 2003-223891 A | 8/2003 |
| JP | 2007-123237 A | 5/2007 |
| JP | 4177612 B2 | 11/2008 |
| JP | 2009-211956 A | 9/2009 |
| JP | 2009-252397 A | 10/2009 |
| JP | 4366783 B2 | 11/2009 |
| JP | 2010-113920 A | 5/2010 |
| WO | WO 2010/116533 A1 | 10/2010 |

ELECTRIC STORAGE DEVICE

CROSS-REFERENCE TO RELATED APPLICATIONS

This application claims priority from Japanese Patent Application No. 2011-58174, the disclosure of which is incorporated herein by reference in their entireties.

FIELD OF THE INVENTION

The present invention relates to an electric storage device provided with an electrode assembly that includes a positive electrode and a negative electrode each having a current collector, on which an active material layer is formed, the positive electrode and the negative electrode being wound or stacked with a separator interposed therebetween.

BACKGROUND ART

In recent years, there have been adopted rechargeable and dischargeable electric storage devices, such as battery cells (e.g., a lithium-ion battery cell and a nickel-metal hydride battery cell) and capacitors (e.g., an electrical double layer capacitor). As this type of a battery cell, there is known, for example, a battery cell provided with an electrode assembly that includes a positive electrode including a positive-electrode current collector provided with a positive-electrode active material layer on a surface thereof except one end, and a negative electrode including a negative-electrode current collector provided with a negative-electrode active material layer on a surface thereof except one end, the positive electrode and the negative electrode being wound or stacked with a separator interposed therebetween, and one end of each of the positive electrode and the negative electrode protrudes, as active material layer-unformed parts, from a side end of the remaining electrode different in polarity, and having a structure in which the electrode assembly is housed in a case with the protruding direction of the one end oriented sideways.

Incidentally, a distance from an electrode assembly to an external terminal in a battery cell used for high-power applications, such as industrial equipment's power supplies, unmanned transportation vehicles, EVs (electric vehicles), HEVs (hybrid electric vehicles), aircraft, marine vessels, railways, and the like, needs to be shorted in order to reduce resistance. Considering a reduction in the number of manufacturing steps and an improvement in reliability in addition to this requirement, it is most suitable to adopt a structure in which active material layer-unformed parts of the electrode assembly are bundled together and welded to current collecting members. In addition, in order to improve reliability by preventing airtightness failure and the like, an opening of the case need to be limited to one place. Yet additionally, a cylindrical battery cell or a stacked battery cell has a structure in which an electrode assembly and a case are held in close contact with each other, and therefore, the case has no space for an extra electrolytic solution to be reserved in. Thus, the battery cell is liable to liquid shortage during a prolonged period of use.

From the considerations discussed above, a battery cell for long-term use in a high-power application preferably has a rectangular structure in which the active material layer-unformed parts of the electrode assembly are bundled together and welded to current collecting members. However, the battery cell having such a structure has a problem that a performance of taking up or sucking up an electrolytic solution within the battery cell (hereinafter referred to as "electrolytic solution sucking-up performance") is not high.

Hence, there has been proposed a battery cell based on the concept that an electrolytic solution reserved in the bottom of a case is taken up or sucked up by means of a capillary phenomenon and supplied to between a positive electrode and a negative electrode by sufficiently reducing respective end-to-end spacings at one end of the positive electrode and/or respective end-to-end spacings at one end of the negative electrode, thereby preventing shortage of the electrolytic solution between the positive electrode and the negative electrode due to long-term use and improving the service life of the battery cell (c.f., Paragraphs 0009 and 0011 in Japanese Patent Laid-Open No. 2010-113920 (Patent Document 1).

In the battery cell described in the abovementioned Patent Document 1, however, it is difficult to adjust respective end-to-end spacings at one end of the positive electrode and/or respective end-to-end spacings at one end of the negative electrode to an aimed design value because of the inherent structure of an electrode assembly. It is also difficult to make the respective spacings uniform. Accordingly, in addition to the problem of being inherently not high in the electrolytic solution sucking-up performance, the battery cell described in the Patent Document 1 has the problem that the electrolytic solution sucking-up performance differs from battery cell to battery cell, thus causing an interindividual difference in battery cell life.

Even if it has been possible to adjust the abovementioned spacings to an aimed design value and make the respective spacings uniform at the time of manufacture, the electrode assembly becomes deformed due to an external force, such as vibration or impact, or an internal stress caused by the expansion and contraction of an active material. Consequently, the battery cell described in the Patent Document 1 has the problem that the abovementioned spacings vary over the time and the electrolytic solution sucking-up performance degrades. In the case of the battery cell described in the Patent Document 1, in particular, which adopts a configuration of suspending the electrode assembly by current collecting members, an external force, such as vibration or impact, may in some instances concentrate on a welded part between the electrode assembly and each current collecting member. In such an instance, it is extremely difficult to keep the abovementioned spacings constant.

In addition, in the battery cell described in the Patent Document 1, an upper portion of the electrode assembly and each current collecting member are welded to each other, and the electrode assembly is compressed at the welded part. Accordingly, the abovementioned spacings may not necessarily be maintained up to the upper portion of the electrode assembly. Thus, the battery cell described in the Patent Document 1 may fail to supply the electrolytic solution up to the upper portion of the electrode assembly.

This sort of problem is not limited to battery cells, but is also true for capacitors (e.g., electrical double layer capacitors).

SUMMARY OF THE INVENTION

Hence, the present invention has been accomplished in view of the above-described problems. Accordingly, it is an object of the invention to provide an electric storage device capable of delivering superior electrolytic solution sucking-up performance.

According to the present invention, there is provided an electric storage device, which includes:

an electrode assembly that includes a positive electrode and a negative electrode each including a current collector provided with an active material layer on a surface thereof except one end, the positive electrode and the negative electrode being wound or stacked with a separator interposed therebetween, wherein one end of one of the positive electrode and the negative electrode on at least one side of the electrode assembly protrudes, as active material layer-unformed parts, from a side end of the remaining electrode different in polarity;

a case for housing the electrode assembly with the protruding direction of the one end oriented sideways; and an electrolytic solution being reserved in the case, wherein the active material layer-unformed parts include electrolytic solution-sucking-up layers that are porous and are formed along a direction orthogonal to the protruding direction of the one end.

In an embodiment of the present invention, the electric storage device may have a configuration in which:

the Young's modulus of the electrolytic solution-sucking-up layers is in a range from 0.01 to 300 GPa.

In another embodiment of the present invention, the electric storage device may have a configuration in which:

the active material layer-unformed parts are bundled together at portions located away from the active material layers to form a sloping section converging toward the bundled portion, and the electrolytic solution-sucking-up layers are formed in the sloping section.

In still another embodiment of the present invention, the electric storage device may have a configuration in which:

the electrolytic solution-sucking-up layers are formed so as to be held in contact with the active material layers or the separators.

In yet another embodiment of the present invention, the electric storage device may have a configuration in which:

the active material layers and the electrolytic solution-sucking-up layers each contain binder, wherein the mass ratio of the binder in the electrolytic solution-sucking-up layers is higher than the mass ratio of the binder in the active material layers.

In this instance, the mass ratio of the binder in the electrolytic solution-sucking-up layers is preferably in a range from 26 to 80% by mass.

The mass ratio of the binder in the electrolytic solution-sucking-up layers is more preferably in a range from 40 to 60% by mass.

In another embodiment of the present invention, the electric storage device may have a configuration in which:

the porosity of the electrolytic solution-sucking-up layers is higher than the porosity of the active material layers.

In this instance, the porosity of the electrolytic solution-sucking-up layers is preferably in a range from 42 to 73%.

According to another aspect of the present invention, there is provided a method of installing an electric storage device, which includes:

installing any one of the electric storage device with the protruding direction of the one end of the electrode assembly oriented in a horizontal direction or a substantially horizontal direction.

According to still another aspect of the present invention, there is provided an apparatus, which includes:

any one of the electric storage devices installed therein with the protruding direction of the one end of the electrode assembly oriented in a horizontal direction or a substantially horizontal direction.

DETAILED DESCRIPTION OF THE PREFERRED EMBODIMENTS

Figure 1:
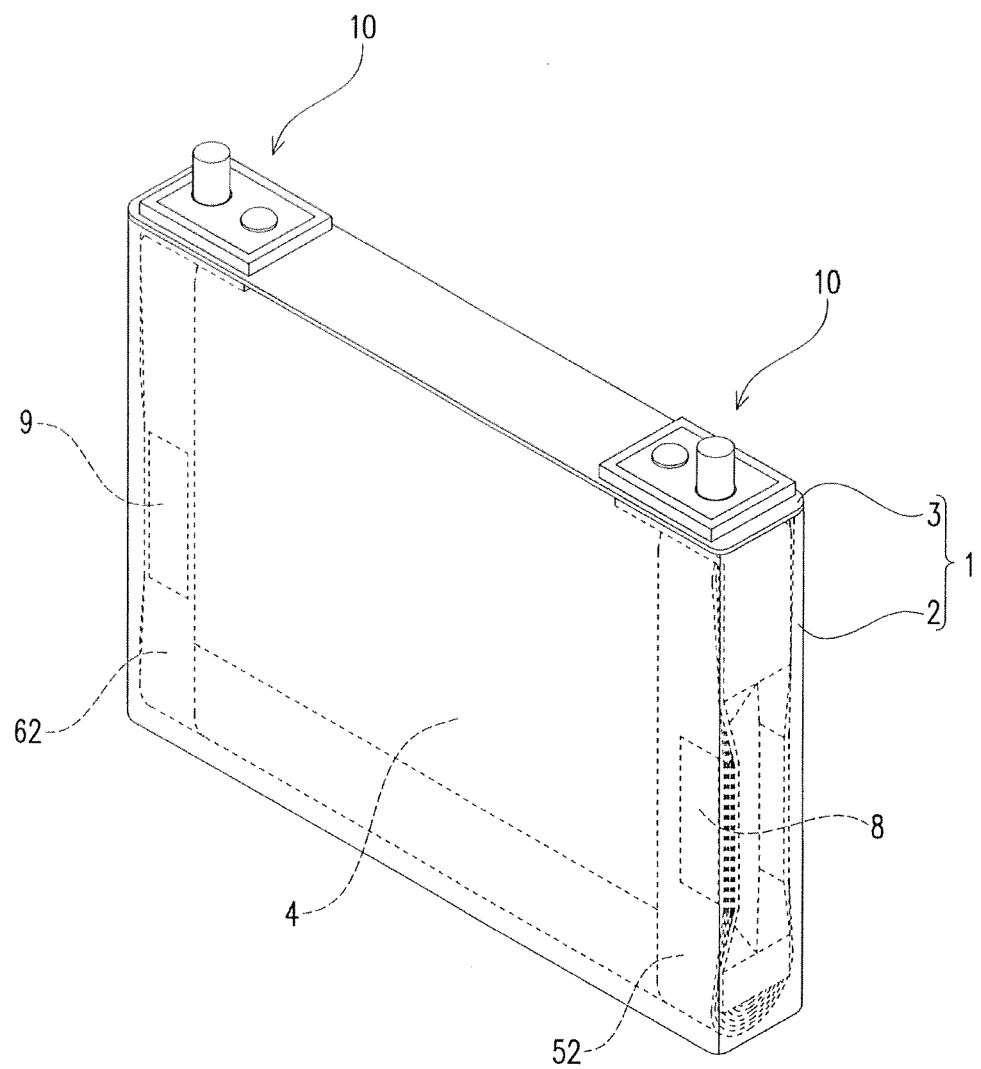
FIG. 1 illustrates a perspective view of a battery cell according to one embodiment of the present invention.
Figure 2:
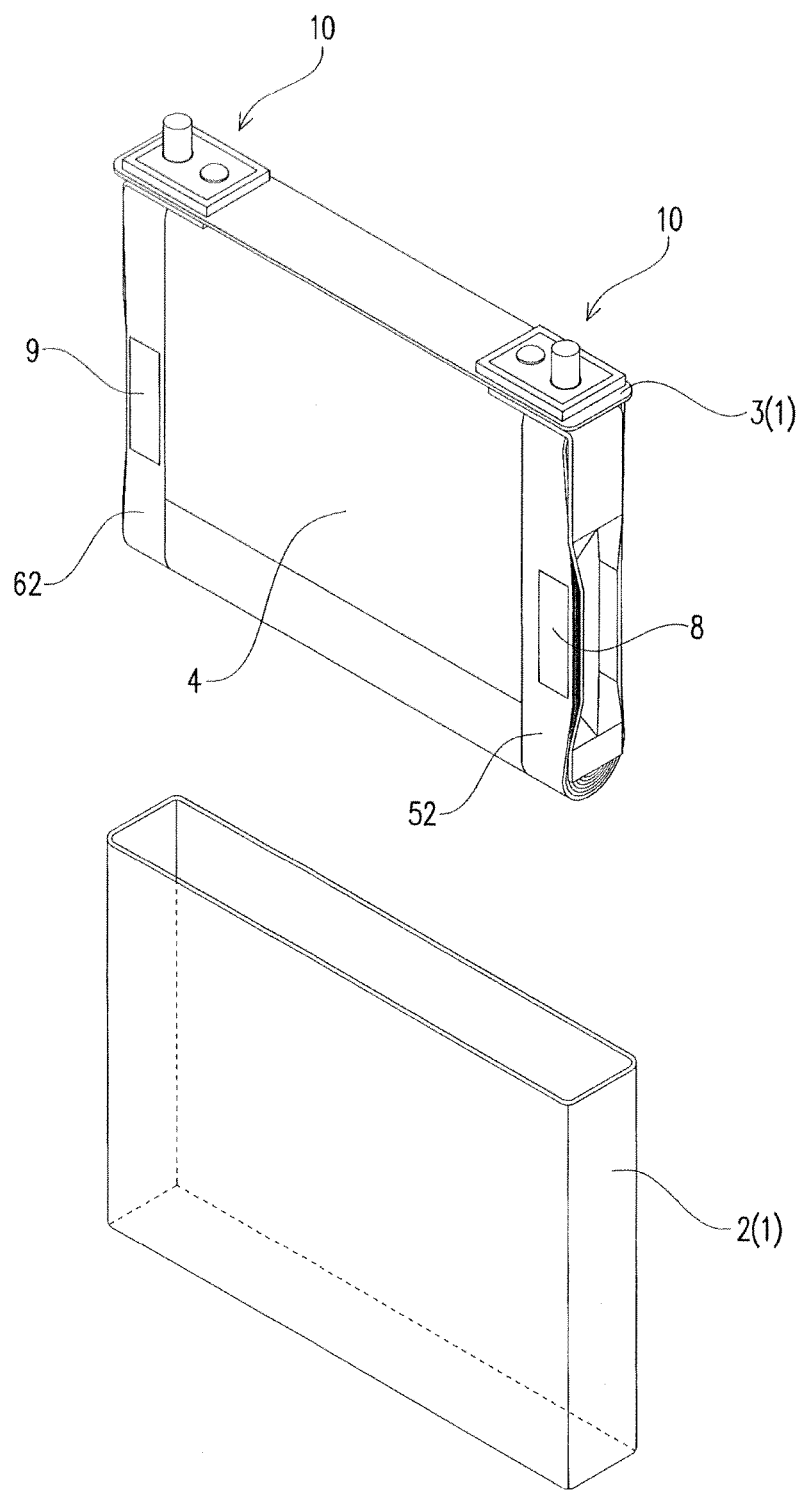
FIG. 2 illustrates an exploded perspective view of the battery cell.
Figure 3:
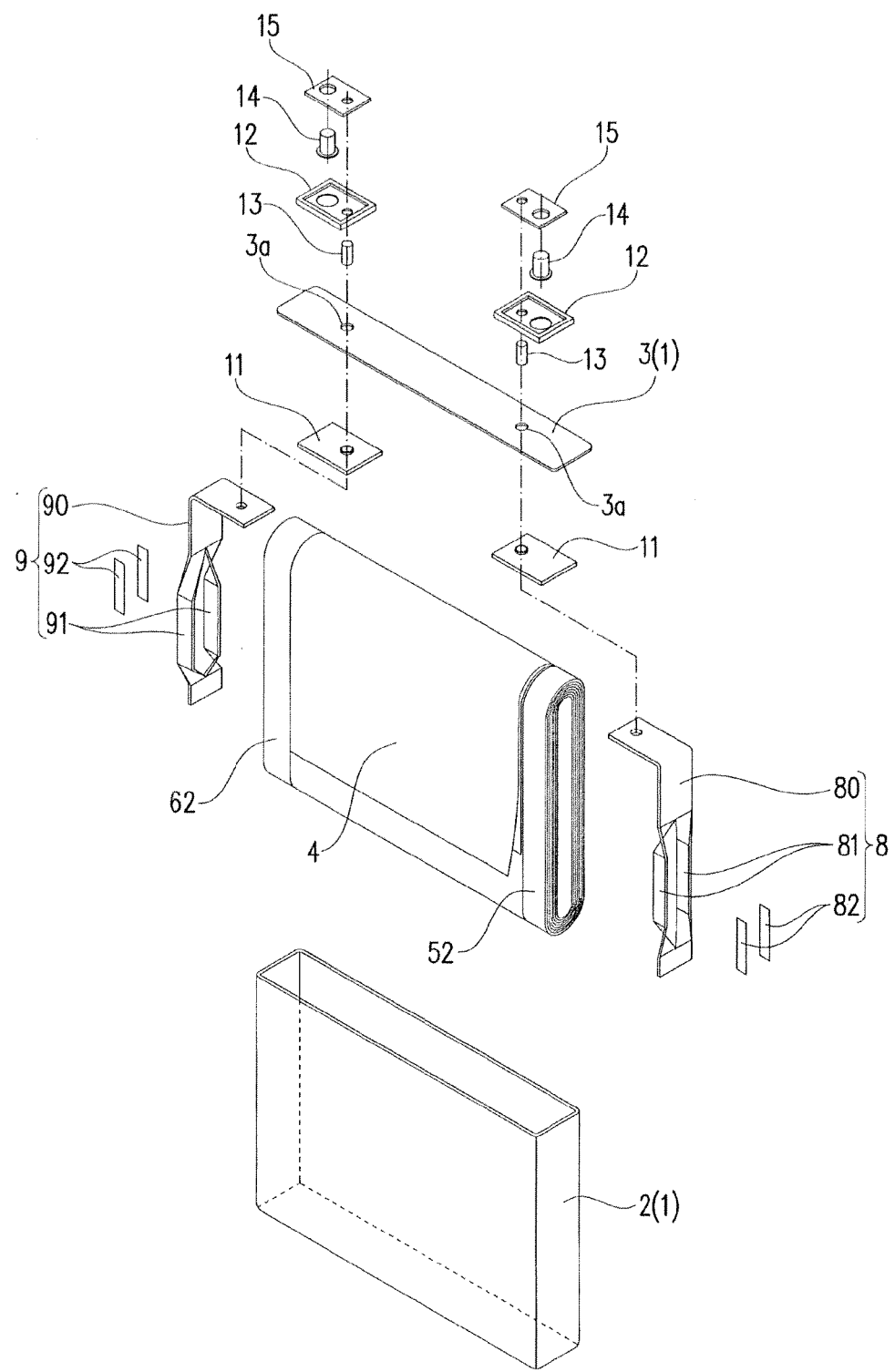
FIG. 3 illustrates a further exploded perspective view of the battery cell.

Hereinafter, a battery cell which is one embodiment of an electric storage device according to the present invention will be described, while referring to the accompanying drawings. The battery cell according to the present embodiment is a nonaqueous electrolyte secondary battery cell, and more specifically, a lithium-ion secondary battery cell. As illustrated in FIG. 1 to FIG. 3, a case 1 is composed of a case body 2 and a cover plate 3 for sealing the case 1 by closing an upper-end opening of the case body 2. An electrode assembly 4 is housed in the case 1. The cover plate 3 is provided with terminal structures 10 electrically connected to the electrode assembly 4.

The case 1, as well as the case body 2 and the cover plate 3, is a metal member made of aluminum, aluminum alloy, steel, or the like. As the case body 2, a bottomed rectangular cylinder, which is flat in the width direction, is used, in order to house the winding-type electrode assembly 4 having the shape of an ellipsoidal cylinder. For the cover plate 3, a rectangular plate material corresponding to the upper-end opening of the case body 2 is used. The cover plate 3 is fitted in the upper-end opening of the case body 2, and is fixed by means of laser welding or the like.

Figure 4A:
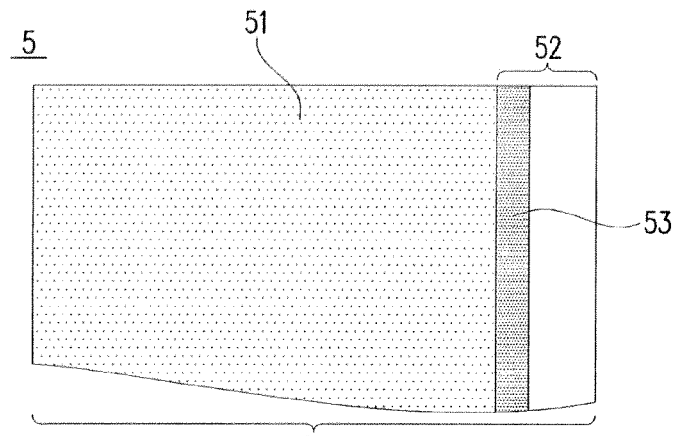
FIG. 4A is an explanatory diagram used to describe respective elements of a positive electrode composing an electrode assembly.
Figure 4B:
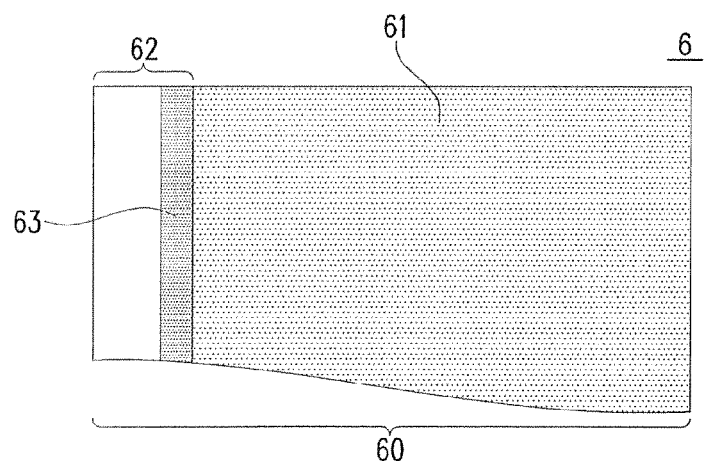
FIG. 4B is an explanatory diagram used to describe respective elements of a negative electrode composing the electrode assembly.
Figure 4C:
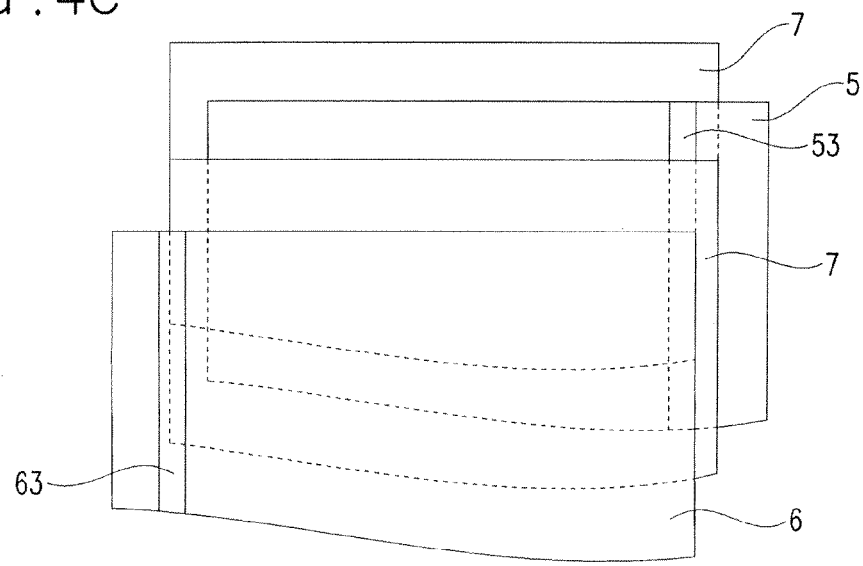
FIG. 4C is an explanatory diagram used to describe a configurational relationship among a positive electrode, a negative electrode and separators in the width direction thereof.

As illustrated in FIG. 4C, the electrode assembly 4 is formed by cylindrically winding the positive electrode 5 and the negative electrode 6 with the separator 7 interposed therebetween, and then pressing this cylindrical shape from both sides thereof, thereby squashing and deforming the cylindrical shape into an elliptically cylindrical shape. More particularly, the electrode assembly 4 is formed by stacking the separator 7, the negative electrode 6, the separator 7, and the positive electrode 5 in this order from inside, winding the stacked body into a cylindrical shape, and then pressing the cylindrical shape from both sides thereof, thereby squashing and deforming the cylindrical shape into an elliptically cylindrical shape. Alternatively, the electrode assembly 4 may be formed by stacking the separator 7, the negative electrode 6, the separator 7, and the positive electrode 5 in this order from inside, and winding the stacked body into an elliptically cylindrical shape.

As illustrated in FIG. 4A, the positive electrode 5 is provided with positive-electrode active material layers (positive-electrode active material-coated parts) 51 on both surfaces of a positive-electrode current collector 50 by, for example, coating a positive-electrode active material on one surface of the positive-electrode current collector 50 made of band-shaped aluminum foil and drying the material, and then likewise coating the positive-electrode active material on the other surface of the positive-electrode current collector 50 and drying the material. As the positive-electrode active material, there is used, for example, a material prepared by dispersing and kneading a composite oxide ($Li_xCoO_2$, $Li_xNiO_2$, $Li_xMn_2O_4$, $Li_xMnO_3$, $Li_xNi_yCo_{(1-y)}O_2$, $Li_xCo_yNi_zMn_{(1-y-z)}O_2$ or the like) represented as $Li_xMO_y$ (M denotes at least one type of transition metal) or a compound having an olivine structure represented as $LiMePO_4$ (Me is, for example, Fe, Mn, Co or Cr), a conductive substance such as carbon black, and a binder such as polyvinylidene fluoride (PVDF), along with a solvent such as N-methyl-2-pyrrolidone (NMP).

As illustrated in FIG. 4B, the negative electrode 6 is provided with negative-electrode active material layers (negative-electrode active material-coated parts) 61 on both surfaces of a negative-electrode current collector 60 by, for example, coating a negative-electrode active material on one surface of the negative-electrode current collector 60 made of band-shaped copper foil and drying the material, and then likewise coating the negative-electrode active material on the other surface of the negative-electrode current collector 60 and drying the material. As the negative-electrode active material, there is used, for example, a material prepared by dispersing and kneading lithium-dopable/dedopable pyrolytic carbons; cokes such as pitch coke, needle coke, and petroleum coke; graphites; glassy carbons; a baked body of an organic polymer compound made by baking phenol resin, furan resin, or the like; carbonaceous material such as carbon fiber or activated carbon; a conductive polymer material such as polyacetylene or polypyrrole, a conductive substance such as carbon black, and a binder such as polyvinylidene fluoride (PVDF), along with a solvent such as N-methyl-2-pyrrolidone (NMP).

More particularly, by, for example, coating the positive-electrode active material on both surfaces of the positive-electrode current collector 50, except one lateral end thereof, the positive electrode 5 is provided with the positive-electrode active material layers 51 on both surfaces, except the lateral one end, of the positive-electrode current collector 50. For this reason, the one end takes the form of a part (positive-electrode active material layer-unformed part (positive-electrode active material-uncoated part) 52) on which the positive-electrode current collector 50 (aluminum foil) is exposed. On the other hand, by, for example, coating the negative-electrode active material on both surfaces of the negative-electrode current collector 60, except one lateral end thereof, the negative electrode 6 is provided with the negative-electrode active material layers 61 on both surfaces, except the one lateral end, of the negative-electrode current collector 60. For this reason, the one end takes the form of a part (negative-electrode active material layer-unformed part (negative-electrode active material-uncoated part) 62) on which the negative-electrode current collector 60 (copper foil) is exposed.

In addition, the positive electrode 5 is provided with a porous layer 53 having a predetermined width on a surface of the positive-electrode current collector 50. More particularly, the positive electrode 5 is provided with porous layers 53 having a predetermined width on both surfaces of the positive-electrode current collector 50. The porous layer 53, as will be described in more detail later, functions as an electrolytic solution-sucking-up layer for taking up or sucking up an electrolytic solution reserved in the bottom of the case body 2 and supplying the electrolytic solution to between the wound positive and negative electrodes 5 and 6. The porous layer 53 is formed so as to be held in contact with the positive-electrode active material layer 51, in order to enhance the ability of electrolytic solution supply. As the porous layer 53, there is selected a material which does not take part in battery cell charging and discharging, is electrochemically stable, and is less liable to deformation due to stress such as compression. For example, the porous layer 53 is a porous body containing an oxide such as alumina, titania or magnesia, or lithium salt such as lithium carbonate or lithium phosphate, and a binder such as polyvinylidene fluoride (PVDF). The material of the porous layer 53 is not limited to those mentioned above, however.

More particularly, the porous layer 53 is formed by, for example, coating a coating material prepared by dispersing and kneading an oxide such alumina, titania or magnesia, or lithium salt such as lithium carbonate or lithium phosphate, and a binder such as polyvinylidene fluoride (PVDF) on a region abutting on the positive-electrode active material layer 51 and having a predetermined width, among the regions of one surface of the positive-electrode active material layer-unformed part 52 and drying the coating material, and then likewise coating such a coating material on the other surface of the positive-electrode current collector 50 and drying the coating material.

The negative electrode 6 is likewise provided with a porous layer 63. The porous layers 63 each are formed so as to be held in contact with the negative-electrode active material layers 61, in order to enhance the ability of electrolytic solution supply. As the porous layer 63, there is selected a material which does not take part in battery cell charging and discharging, is electrochemically stable, and is less liable to deformation due to stress such as compression. For example, the porous layer 63 is a porous body containing an oxide such as alumina, titania or magnesia, or lithium salt such as lithium carbonate or lithium phosphate, and a binder such as polyvinylidene fluoride (PVDF). The material of the porous layer 63 is not limited to those mentioned above, however.

In the porous layers 53 and 63, the characteristic of being less liable to deformation due to stress such as compression, as well as the characteristic of not taking part in battery cell charging and discharging and being electrochemically stable, is an extremely important factor. As described above, the electrode assembly 4 is inherently deformable due to an external force, such as vibration or impact, or an internal stress caused by the expansion and contraction of an active material. For the battery cell according to the present embodiment, in particular, which adopts a configuration of suspending the electrode assembly 4 by current collecting members 8 and 9 to be described later, an external force, such as vibration or impact, is liable to concentrate on a welded part between the electrode assembly 4 and the current collecting members 8 and 9. Accordingly, the porous layers 53 and 63 need to be made as free as possible from the effects of these environmental factors.

Hence, the Young's modulus (elastic modulus) of the porous layers 53 and 63 measured according to JIS R 1602 is set so as to fall in a range from 0.01 GPa or higher, more preferably, 0.1 GPa or higher, to 300 GPa or lower, more preferably, 200 GPa or lower. Consequently, the electrolytic solution sucking-up performance can be secured since the internal pressure of the battery cell at the end of service life is sufficiently lower than a lower limit of 0.01 GPa. Note that the Young's modulus of the porous layers 53 and 63 can be lowered by increasing the ratio of the binder, and can be raised by increasing the ratio of the oxide or the lithium salt (inorganic particles).

In the above instance, the mass ratio of the binder in the porous layers 53 is preferably higher than the mass ratio of the binder in the positive-electrode active material layers 51, and the mass ratio of the binder in the porous layers 63 is preferably higher than the mass ratio of the negative-electrode active material layers 61. For example, the mass ratio of the binder in the porous layers 53 and 63 is in a range from 26% by mass or higher and more preferably 40% by mass or higher to 80% by mass or lower and more preferably 60% by mass or lower. The higher the mass ratio of the binder in the porous layers 53 and 63, the higher the amount of an electrolytic solution to be sucked up by the porous layers 53 and 63 is. Consequently, the higher the mass ratio of the binder in the porous layers 53 and 63, the higher the supply efficiency of electrolytic solution can be. According to the mass ratio of the binder in the porous layers 53 and 63, on the premise that the mass ratio of the binder in the porous layers 53 and 63 is higher than the mass ratio of the binder in the active material layers 51 and 61, the mass ratio of the binder in the positive-electrode active material layers 51 is preferably in a range from 2 to 8% by mass, and the mass ratio of the binder in the negative-electrode active material layers 61 is preferably in a range from 2 to 8% by mass.

The porosity of the porous layers 53 is preferably higher than the porosity of the positive-electrode active material layers 51, and the porosity of the porous layers 63 is preferably higher than the porosity of the negative-electrode active material layers 61. For example, the porosity of the porous layers 53 and 63 is preferably in a range from 42% or higher to 73% or lower. The higher the porosity of the porous layers 53 and 63, the easier an electrolytic solution penetrates the porous layers 53 and 63 and hence the higher the penetration rate is. Consequently, the supply efficiency of an electrolytic solution can be increased.

The porosity can be calculated by the following equations (1) and (2):

$$\text{Porosity}(\%) = 100 - \{(\text{coating density/true density}) \times 100\} \quad (1)$$

$$\text{Coating density } (g/cm^3) = \text{coating weight } (g/cm^2) / \text{thickness of active material layer (cm)} \quad (2)$$

The porosity can be measured by a mercury intrusion technique using a mercury porosimeter.

The thicknesses of the porous layers 53 and 63 are specified as being no greater than those of the positive-electrode active material layer 51 and the negative-electrode active material layer 61 (for example, several tens to several hundreds of μm), in order to avoid adding to the thickness of the electrode assembly 4 when the porous layers 53 and 63 are assumed to be originally not present.

Each separator 7 serves to physically separate the positive electrode 5 and the negative electrode 6 from each other, and retain an electrolytic solution, as illustrated in FIG. 4C. As the material of the separator, there is used a microporous film, such as a polyethylene or polypropylene film.

Note that in consideration of dendrite deposition or the like, the negative-electrode active material layer 61 of the negative electrode 6 is coated across an area wider than the coated area of the positive-electrode active material layer 51 of the positive electrode 5. In addition, each separator 7 is larger in width than the positive-electrode active material layer 51 of the positive electrode 5 and the negative-electrode active material layer 61 of the negative electrode 6, in order to ensure insulation. However, each separator 7 is set to such a width as not to cover the positive-electrode active material layer-unformed part 52 of the positive electrode 5 and the negative-electrode active material layer-unformed part 62 of the negative electrode 6 protruding in the width direction thereof.

Figure 5A:
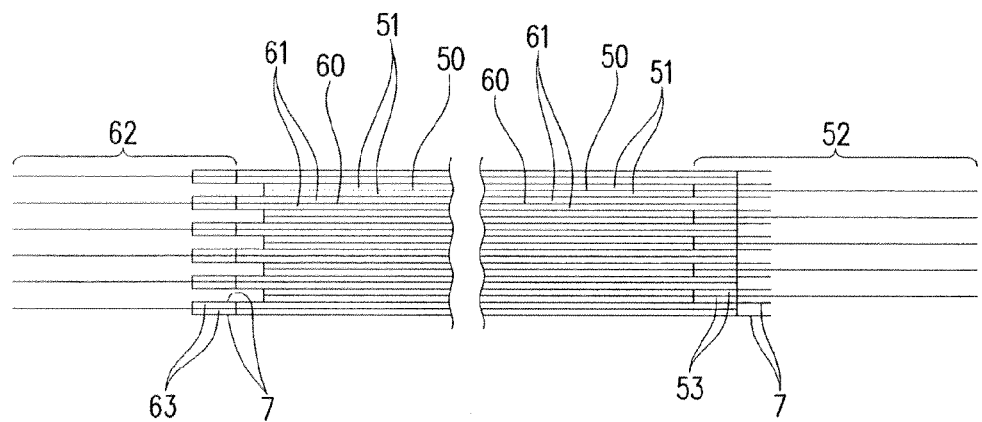
FIG. 5A illustrates a transverse cross-sectional view of the electrode assembly.

As the result of the positive electrode 5 and the negative electrode 6 being horizontally displaced from each other in the width direction thereof and wound, the positive-electrode active material layer-unformed part 52 of the positive electrode 5 protrudes from a side end of the negative electrode 6 on one side of the electrode assembly 4, as illustrated in FIG. 5A. On the other hand, the negative-electrode active material layer-unformed part 62 of the negative electrode 6 protrudes from a side end of the positive electrode 5 on the other side of the electrode assembly 4.

Figure 5B:
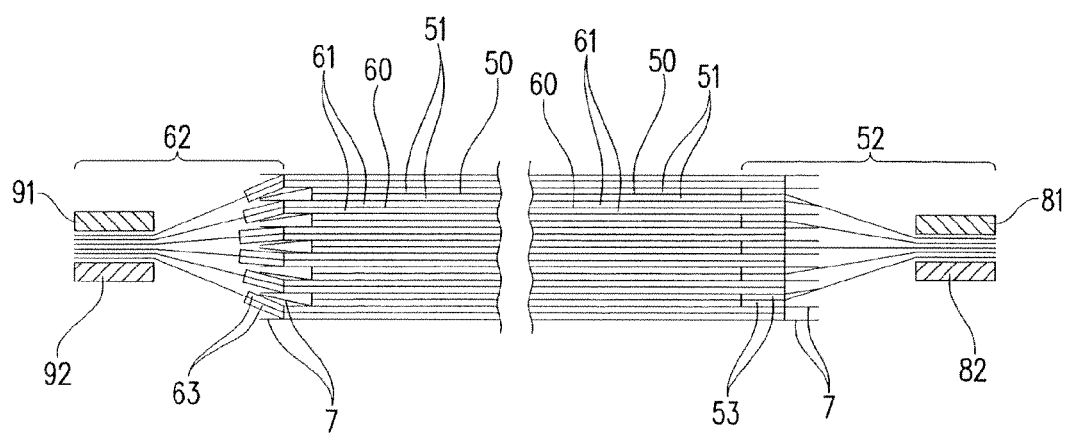
FIG. 5B illustrates a transverse cross-sectional view of the electrode assembly in a state in which a positive-electrode current collecting member and a negative-electrode current collecting member are joined to ends of the electrode assembly.

As illustrated in FIG. 5B, the positive-electrode active material layer-unformed parts 52 of the wound positive electrodes 5 protruding on one side of the electrode assembly 4 are brought into close contact with one another. In addition, the closely-contacted portions and a positive-electrode current collecting member 8 made of, for example, aluminum or aluminum alloy are joined together. Likewise, the negative-electrode active material layer-unformed parts 62 of the wound negative electrodes 6 protruding on the other side of the electrode assembly 4 are brought into close contact with one another. In addition, the closely-contacted portions and a negative-electrode current collecting member 9 made of, for example, copper or copper alloy are joined together.

Here, the positive-electrode active material layer-unformed parts 52 on one side of the electrode assembly 4, as the result of being brought into close contact with one another at the time of being joined to the current collecting member 8, converge from the positive-electrode active material layer 51 toward the positive-electrode current collecting member 8 located in a position away (in the lengthwise direction of a winding axis of the electrode assembly 4) from the positive-electrode active material layer 51 to form a sloping section. Likewise, the negative-electrode active material layer-unformed parts 62 on the other side of the electrode assembly 4, as the result of being brought into close contact with one another at the time of being joined to the current collecting member 9, converge from the negative-electrode active material layer 61 toward the negative-electrode current collecting member 9 located in a position away (in the lengthwise direction of a winding axis of the electrode assembly 4) from the negative-electrode active material layer 61 to form a sloping section. In addition, a gap is formed between each adjacent positive-electrode active material layer-unformed parts 52 and between each adjacent negative-electrode active material layer-unformed parts 62 in these sloping sections, respectively.

The electrolytic solution-sucking-up layers 53 and 63 are disposed in these gaps. Accordingly, the retentivity of an electrolytic solution is increased and the electrolytic solution sucking-up performance is enhanced further. Consequently, the battery cell holds promise of providing high and stable ability in electrolytic solution supply. In addition, as described above, the porous layers 53 and 63 are provided so as to be also held in contact with the separators 7, as well as with the positive-electrode active material layers 51 and the negative-electrode active material layers 61. Consequently, the ability of electrolytic solution supply is enhanced even further.

Note that for the better understanding of the way of winding, FIG. 5 illustrates the cross-sectional views with the number of turns of the positive and negative electrodes 5 and 6 decreased. In practice, however, the electrodes are wound with a larger number of turns. In addition, the joining together of one end of the electrode assembly 4 and the positive-electrode current collecting member 8 and the joining together of the other end of the electrode assembly 4 and the negative-electrode current collecting member 9 can be performed by various means, including ultrasonic joining, resistance welding, laser welding, and caulking. From a comprehensive viewpoint of thermal influence on positive-electrode active material layers and negative-electrode active material layers, sputtering, electrical conduction resistance at a junction, workability, and the like, however, the joining together is desirably performed by means of ultrasonic joining.

The positive-electrode current collecting member 8 is inserted in an internal space of one end of the electrode assembly 4, as illustrated in FIG. 5B and FIG. 3. The positive-electrode current collecting member 8 includes a main unit 80 provided with abutting parts 81 each to be held in abutment with part of a flat portion (central portion in the present embodiment) of an elliptically cylindrical shape, among the portions of an inner circumferential surface of the one end (i.e., the innermost circumferential surface of the positive-electrode active material layer-unformed part 52 of the wound positive electrode 5), and pad plates 82 disposed oppositely to the abutting parts 81 of the main unit 80 with the wound positive-electrode active material layer-unformed part 52 therebetween. The pad plates 82 are pressed toward the corresponding abutting parts 81 of the main unit 80, thereby compressing the positive-electrode active material layer-unformed parts 52 between the abutting parts 81 and the pad plates 82. As a result, each abutted flat portion, the abutting part 81, and the pad plate 82 are brought into close contact with one another and joined together. The same holds true for the negative-electrode current collecting member 9.

Each terminal structure 10 is composed of a plastic plate 11 serving as an insulating member (an insulating and sealing member, if the plastic plate also has a sealing function) and a gasket 12 serving as an insulating and sealing member disposed so as to sandwich a corresponding one of through-holes 3a formed at the right and left-side ends of a cover plate 3 from inside and outside, a rivet 13 inserted into the through-hole 3a through the plastic plate 11 and the gasket 12 and electrically connected to the positive-electrode current collecting member 8 and the negative-electrode current collecting member 9, an external terminal 14 disposed external to the cover plate 3 through the gasket 12, and a connecting plate 15 for electrically connecting the external terminal 14 and the rivet 12 to each other. Consequently the electrode assembly 4 within the case 1 and the external terminal 14 are electrically connected to each other.

Figure 6:
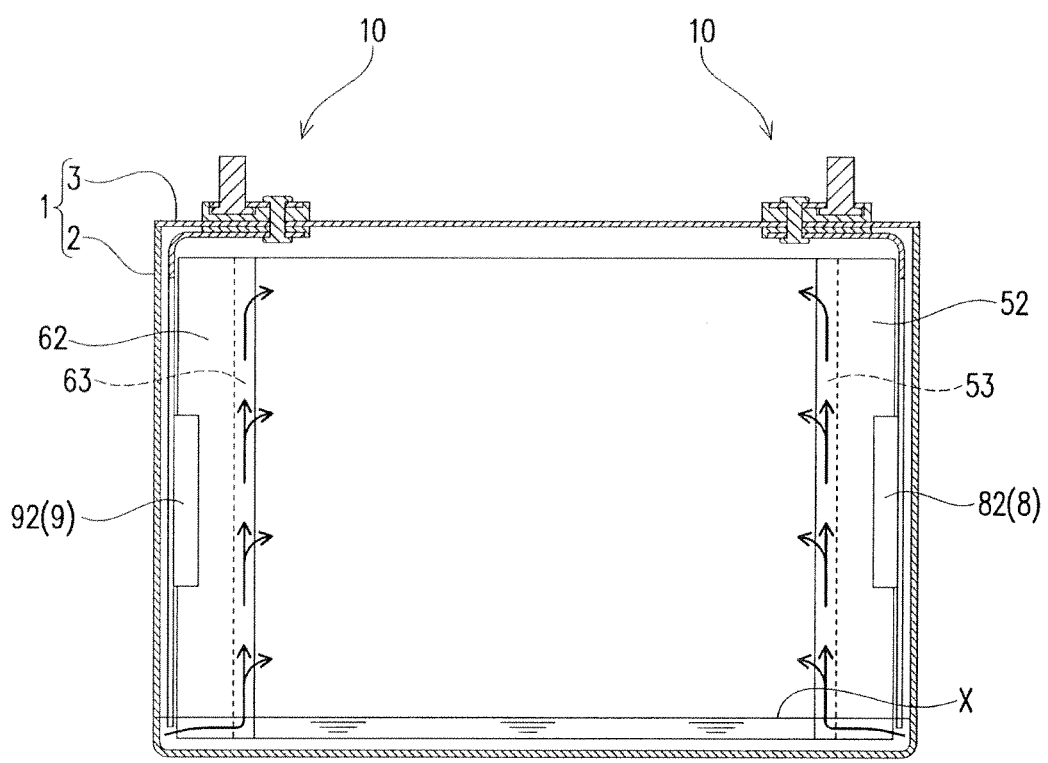
FIG. 6 is an explanatory diagram used to describe the state of electrolytic solution flow in an electrode assembly.

In the thus described present embodiment, the electrode assembly 4 is transversely positioned and housed in the case body 2 to have a winding axis oriented in parallel or substantially parallel to the bottom of the case body 2. The battery cell of the present embodiment is installed in an apparatus with the bottom of the case body 2 positioned at a lower side and the upper-end opening of the case body 2 positioned at an upper side. Whereby, as illustrated in FIG. 6, the electrolytic solution-sucking-up layers 53 and 63 are continuously arranged in the positive-electrode active material layer-unformed part 52 on one side of the transversely-positioned electrode assembly 4 and the negative-electrode active material layer-unformed part 62 on the other side, respectively, from the lower ends to the top ends of the parts.

Accordingly, an electrolytic solution X reserved in the bottom of the case body 2 is taken up or sucked up in the directions represented by arrows in the Figure, and is supplied to between the wound positive electrodes 5 and between the wound negative electrodes 6. Consequently, superior electrolytic solution sucking-up performance is delivered.

In addition, a junction between the positive-electrode active material layer-unformed part 52 on one side of the electrode assembly 4 and the positive-electrode current collecting member 8 and a junction between the negative-electrode active material layer-unformed part 62 on the other side of the electrode assembly 4 and the negative-electrode current collecting member 9, i.e., portions, at which positive-electrode active material layer-unformed parts 52 and negative-electrode active material layer-unformed parts 62 are bundled together in order for the parts to be joined to the current collecting members 8 and 9, are positioned upper than the lower end of the transversely-positioned electrode assembly 4, or placed in an intermediate position between the upper and lower ends of the electrode assembly 4, to be exact. This means that the respective lower ends of the positive-electrode active material layer-unformed part 52 on one side of the electrode assembly 4 and the negative-electrode active material layer-unformed part 62 on the other side are located away from the junctions, and therefore, hardly undergo restraints due to joining, and that the ends are made open with narrow gaps being present. Accordingly, the electrolytic solution X reserved in the bottom of the case body 2 easily enters a gap between the positive-electrode active material layer-unformed parts 52 and a gap between the negative-electrode active material layer-unformed parts 62 at the lower end of the transversely-positioned electrode assembly 4, and spreads itself. The electrolytic solution-sucking-up layers 53 and 63 are placed in a state of being constantly immersed in this electrolytic solution. Consequently, superior electrolytic solution sucking-up performance is delivered also in this regard.

In addition, the efficiency of electrolytic solution supply is enhanced as the result of the electrolytic solution-sucking-up layer 63 being arranged in a triangular space of a sloping section formed by bundling the ends of negative-electrode active material layer-unformed parts 62, being arranged so as to be held in contact with the positive-electrode active material layer 51 and the negative-electrode active material layer 61, or being arranged so as to be held in contact with the separator 7.

For the electrolytic solution-sucking-up layers 53 and 63, a material less liable to deformation due to stress such as compression is used. Accordingly, the electrolytic solution-sucking-up layers 53 and 63 are less dependent on environmental factors, including an external force, such as vibration or impact, and an internal stress due to the expansion and contraction of an active material. Consequently, high performance is maintained in electrolytic solution sucking-up, irrespective of a secular variation caused by the use of the battery cell.

Note that the battery cell according to the present invention is not limited to the above-described embodiments, but may be modified in various other ways without departing from the spirit and scope of the present invention.

For example, a winding-type battery cell has been mentioned in the above-described embodiments. However, a stacked battery cell in which a sheet-like positive electrode, separator, negative electrode, and separator are stacked in this order is also intended by the present invention.

In addition, in the above-described embodiments, electrolytic solution-sucking-up layers 53 and 63 are provided on both surfaces of the positive-electrode current collector 50 (positive-electrode active material layer-unformed part 52) and on both surfaces of the negative current collector 60 (negative-electrode active material layer-unformed part 62). Alternatively, each electrolytic solution-sucking-up layer may be provided only on one surface of each current collector.

Yet additionally, in the above-described embodiments, the electrolytic solution-sucking-up layers 53 and 63 are arranged along the longitudinal direction of the positive electrode 5 and negative electrode 6. Alternatively, however, the electrolytic solution-sucking-up layers may be arranged continually, locally, partially, or sporadically. That is, the electrolytic solution-sucking-up layers have only to be formed across an area from a position at which the electrolytic solution-sucking-up layers abut on a surface of the electrolytic solution to the upper portion of the electrode assembly. In addition, needless to say, the electrolytic solution-sucking-up layers may be formed in both the positive and negative electrodes, or only in the positive electrode or the negative electrode.

Still additionally, in the above-described embodiments, the negative-electrode active material layer 61 is made larger in width than the positive-electrode active material layer 51, as described above. Accordingly, not all of the positive-electrode active material layer-unformed parts 52 protrude from side ends of the negative electrodes 6 (negative-electrode active material layers 61). Therefore, the electrolytic solution-sucking-up layer 53 on the positive electrode 5 side is not positioned in a sloping section formed as the result of the ends of positive-electrode active material layer-unformed parts 52 being bundled together. The electrolytic solution-sucking-up layer 53 on the positive electrode 5 side can be positioned in the sloping section, however, by allowing all of the positive-electrode active material layer-unformed parts 52 to protrude from the side ends of the negative electrodes 6 (negative-electrode active material layers 61). It is not essential in the present invention, however, that the electrolytic solution-sucking-up layers 53 and 63 are provided in the sloping section.

Still additionally, in the above-described embodiments, one side each of the positive-electrode active material layer-unformed parts 52 and one side each of the negative-electrode active material layer-unformed parts 62 wound at the time of being joined to the current collecting members 8 and 9 are respectively bundled together on one side each of the right and left sides thereof. Alternatively, however, the right and left-side ends may be bundled together.

Still additionally, in the above-described embodiments, only one electrode assembly 4 is housed in the case 1. Alternatively, however, a plurality of electrode assemblies may be housed therein while being arranged side by side.

Still additionally, in the above-described embodiments, coating is used as a method for allowing surfaces of the current collectors 50 and 60 to support an active material. Alternatively, however, the active material can also be supported by means of, for example, blowing or immersion, in addition to this method.

Still additionally, in the above-described embodiment, the battery cell, which has the electrode assembly 4 housed in the case body 2 with the winding axis of the electrode assembly 4 oriented in parallel to the bottom of the case body 2, is installed in an apparatus with the bottom of the case body 2 positioned at a lower side and the upper-end opening of the case body 2 positioned at an upper side to have a protruding direction of the ends of the electrode assembly 4 oriented in a horizontal direction or a substantially horizontal direction. This is not essential. A battery cell may be installed in an apparatus to have the projecting direction of the ends of the electrode assembly 4 oriented in a horizontal direction or a substantially horizontal direction, even when the electrode assembly 4 is housed in the case body 2 with the winding axis of the electrode assembly 4 oriented perpendicular to the bottom of the case body 2.

Still additionally, in the above-described embodiments, a description has been given of a lithium-ion secondary battery cell. However, the type and size (capacity) of the battery cell are optional.

Still additionally, the present invention is not limited to a lithium-ion secondary battery cell. Alternatively, the present invention can also be applied to other various secondary battery cells, primary battery cells, and capacitors such as an electrical double layer capacitor.

The invention claimed is:

1. An electric storage device, comprising:
   an electrode assembly that includes a positive electrode and a negative electrode each including a current collector provided with an active material layer on a surface thereof except an active material layer-unformed part at one end, the positive electrode and the negative electrode being wound or stacked with a separator interposed therebetween;
   a case for housing the electrode assembly, the case including a bottom surface and a top surface, the top surface being open and connecting to the bottom surface through side surfaces of the case; and
   an electrolytic solution being reserved in the case,
   wherein the active material layer-unformed part of one of the positive electrode and the negative electrode protrudes, in a direction parallel to the bottom surface of the case, from a remaining electrode different in polarity, and
   wherein the active material layer-unformed parts include electrolytic solution-sucking-up layers that are porous and are formed along a direction orthogonal to the bottom surface of the case.

2. The electric storage device according to claim 1, wherein a Young's modulus of the electrolytic solution-sucking-up layers is in a range from 0.01 GPA to 300 GPa.

3. The electric storage device according to claim 1, wherein the active material layer-unformed parts are bundled together at portions located away from the active material layers to form a sloping section converging toward a bundled portion, and the electrolytic solution-sucking-up layers are formed in the sloping section.

4. The electric storage device according to claim 1, wherein the electrolytic solution-sucking-up layers are formed so as to be held in contact with the active material layers.

5. The electric storage device according to claim 1, wherein the electrolytic solution-sucking-up layers are formed so as to be held in contact with the separators.

6. The electric storage device according to claim 1, wherein the active material layers and the electrolytic solution-sucking-up layers each contain a binder, and
   wherein a mass ratio of the binder in the electrolytic solution-sucking-up layers is higher than a mass ratio of the binder in the active material layers.

7. The electric storage device according to claim 6, wherein the mass ratio of the binder in the electrolytic solution-sucking-up layers is in a range from 26% to 80% by mass.

8. The electric storage device according to claim 6, wherein the mass ratio of the binder in the electrolytic solution-sucking-up layers is in a range from 40% to 60% by mass.

9. The electric storage device according to claim 1, wherein a porosity of the electrolytic solution-sucking-up layers is higher than a porosity of the active material layers.

10. The electric storage device according to claim 9, wherein the porosity of the electrolytic solution-sucking-up layers is in a range from 42% to 73%.

11. A method of installing an electric storage device, the method comprising:
 installing the electric storage device of claim 1 with a protruding direction of one end of the electrode assembly oriented in a horizontal direction or a substantially horizontal direction.

12. An apparatus, comprising:
 the electric storage device of claim 1 installed therein with a protruding direction of one end of the electrode assembly oriented in a horizontal direction or a substantially horizontal direction.

\* \* \* \* \*